M. V. JARECKI.
TRACTOR WHEEL.
APPLICATION FILED MAR. 11, 1922.

1,424,909.

Patented Aug. 8, 1922.

Inventor
Mathias V. Jarecki,
By Watson E. Coleman
Attorney

UNITED STATES PATENT OFFICE.

MATHIAS V. JARECKI, OF COLUMBUS, NEBRASKA.

TRACTOR WHEEL.

1,424,909.

Specification of Letters Patent.   Patented Aug. 8, 1922.

Application filed March 11, 1922. Serial No. 542,973.

*To all whom it may concern:*

Be it known that I, MATHIAS V. JARECKI, a citizen of the United States, residing at Columbus, in the county of Platte and State of Nebraska, have invented certain new and useful Improvements in Tractor Wheels, of which the following is a specification, reference being had to the accompanying drawings.

The present invention has for its purpose the provision of an improved, simple and practical construction of rim for tractor wheels, and to provide a construction, wherein the tractor lugs can be removed, leaving the rim bands smooth, so as to travel on level roads, without cutting up the road bed, that is to say paved roads.

Another purpose is the provision of a band, which surrounds the lugs, for the purpose of holding them in place upon the rim of the wheel, there being means connecting the band to the lugs, to prevent relative movement of the band with respect to the lugs.

Obviously the band which assists materially in holding the lugs on the two rims of the wheel, constitutes means to prevent the wheel rim from slipping down on the side of the furrow, when plowing. In fact the tire band keeps the rim in engagement with the top of the furrow.

In practice most of the rims of tractor wheels are slotted, or entirely in one piece. However in the present construction the rim of the wheel is in skeleton form to the extent that it consists of two rim bands, which may be any suitable width and spaced any suitable distance apart, it depending entirely upon the weight and size of the tractor, so that the loose soil can engage or work through the rim of the wheel. In other words the rim is allowed to more readily sink into the soil, and enables the tractor lugs to take a firm hold in the soil, hence insuring a better tractor action during the revoluble movements of the wheel.

When the lugs are removed, it is obvious that the rim bands are held by the plates or bars fitted upon the inner surface of the rim bands, not only to connect the bands, but also to hold the bands in position and properly spaced. These plates or bars are dispose on angles, and receive staples, which hold the tire band in surrounding relation to the plates.

While the design and construction at present illustrated and set forth are deemed preferable, it is obvious that as a result of a reduction of the invention to a more practical form for commercial purposes, the invention may be susceptible of changes, and the right to these changes is claimed, provided they are comprehended within the scope of what is claimed.

The invention comprises further features and combination of parts, as will be hereinafter set forth, shown in the drawings and claimed.

In the drawings:—

Figure 1:
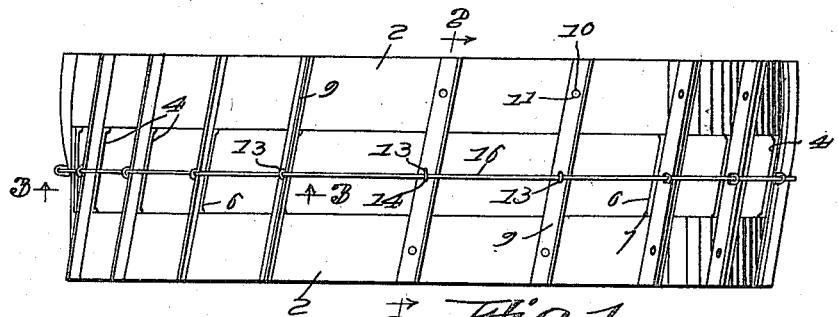
Figure 1 is a plan view of a tractor wheel constructed in accordance with the invention, showing the lugs, which register with the space on the inner surface of the rim, and also illustrating the tire band.
Figure 3:
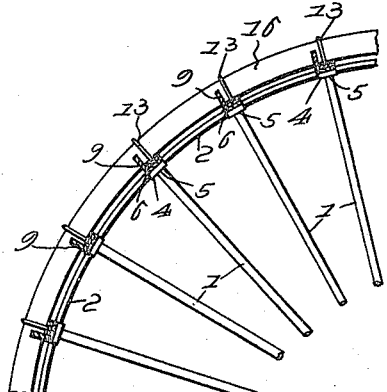
Figure 3 is a sectional view on line 3—3 of Figure 1.
Figure 2:
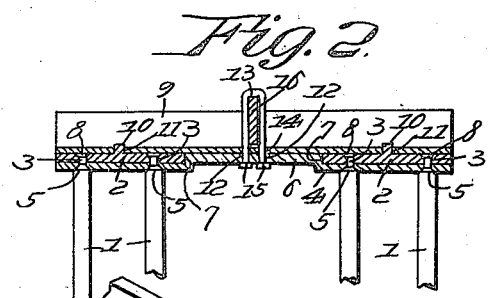
Figure 2 is a sectional view on line 2—2 of Figure 1.
Figure 5:
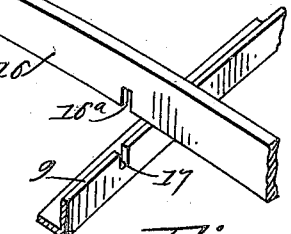
Figure 5 is a detail of one of the lugs and portion of the tire band.
Figure 4:
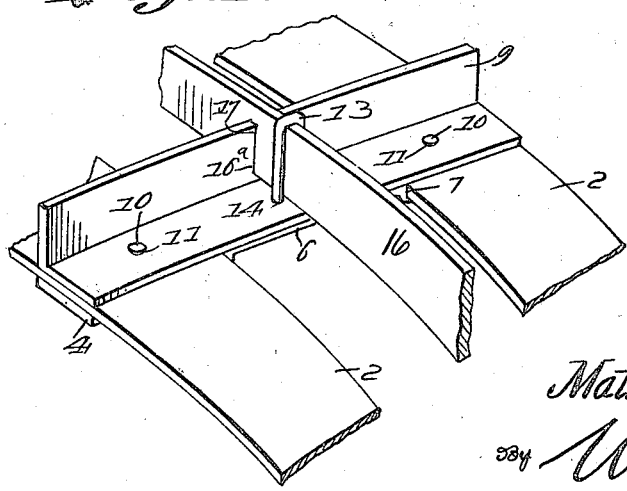
Figure 4 is an enlarged detail perspective view of a portion of the rim, illustrating the two rim bands, the plates and the lugs and the tire band.

Referring to the drawings, 1 designates the spokes of the tractor wheel, and 2 denotes the rim bands, which may be any suitable width, and suitably spaced, it depending entirely upon the size and weight of the tractor which is to be supported by the wheel.

The outer ends of the spokes 1 are reduced as shown at 3, and these reduced portions pass through the holding plates 4 and through the rim bands 2. Adjacent the reduced portions 3, shoulders 5 are provided, which engage the inner surface of the plates or bars 4. It will be noted that these plates or bars are inclined relatively to the rim bands, and their central portions, equal to the space between the rim bands are outwardly pressed, to provide offset portions 6, which engage between the adjacent edges of the rim bands. In fact the ends of the offset portions 6 constitute shoulders 7, which engage the adjacent edges of the rim bands, and prevents them from displacement toward each other, whereas displacement laterally of the bands in opposite directions is prevented by the reduced portions 3 of the spokes. The terminals of the reduced portions 3 of the spokes are headed as shown at 8 adjacent the exterior face of the rim bands 2, in order to insure holding the members relatively fixed.

Arranged on the outer faces of the rim bands are tractor lugs 9, which are angular in cross section, and by means of the projections 10, the tractor lugs are held in place. These projections engage through the lugs.

It will be noted that in Figures 1 to 4 projections 10 are carried by the rim bands, and act to removably hold the tractor lugs in place. Obviously when the tire band 16 is removed, the tractor lugs may be easily detached, by lifting them from engagement with the projections 10, which normally extend through the openings 11 of said lugs.

Figure 6:
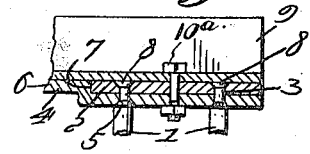
Figure 6 is a sectional view showing a modified structure for holding the lugs in place.

In Figures 6 bolts 10ª are substituted for the projections 10, and obviously when it is desired to remove the tractor lugs, as well as the plates 4, the nuts of said bolts 10ª can be removed, which will permit the removal of the bolts, and allow the parts to be disconnected. Any other suitable means for this purpose may be employed.

The central portions of the plates or bars 4 are provided with spaced openings 12. In fact each plate or bar 4 has a pair of openings, which receive the shanks of the U-shaped clamps 13. The ends of the shanks of the clamps or staples also pass through spaced openings 14 of the tractor lugs, and their terminals are provided with nuts 15, to hold the clamps or staples in place. In fact the staples or clamps straddle the tire band 16, which surrounds the tractor lugs, and is positioned radially. This tire band 16 acts materially to prevent the rim of the tractor wheel from sliding on the side of the furrow. In fact the band 16 retains the rim of the tractor wheel on top of the furrow. The band 16 and the tractor lugs are provided with interengaging recesses 16ª and 17, so that when the band is arranged in position, the outer edge of the band 16 is positioned slightly beyond the outer edges of the tractor lugs 9, in order to permit the wheel to travel on relatively hard and level road ways, without cutting up the surface of the road excessively, particularly transversely. Obviously by means of the clamps or staples, the tire band as well as the lugs are held in position. Since the tire band overlies the tractor lugs, the lugs are prevented from disengaging from the holding extensions 10, which project from the outer surfaces of the rim bands.

By detaching the nuts from the extremities of the shanks, it is possible to remove the tire band, and when said band is removed, the tractor lugs may be detached.

It has been found that a rim of this character for tractor wheels may be operated on any kind of soil, whether it is hilly, level, sandy or hard or soft muddy soil.

It will be noted that by arranging the tire band, so that its outer edge is slightly beyond the edges of the radial flanges of the lugs, the traction wheel may operate with better advantage on hard road beds, due to the fact that the outer edge of the tire band is practically at all times in engagement with the road bed.

The invention having been set forth, what is claimed is:—

1. A tractor wheel rim comprising a pair of spaced rim bands, bars arranged at angles to the bands and secured to the inner surfaces thereof, said bars having central outwardly formed portions engaging between and spacing the rim bands, tractor lugs mounted upon the exterior surface of the rim bands in register with the bars and a radially disposed tire band surrounding the tractor lugs, and operatively connecting said lugs, to not only hold the lugs in place, but also for holding the tire band in position.

2. A tractor rim comprising a pair of spaced rim bands, means for securing them relatively in position, tractor lugs on the exterior surface of the bands in register with the securing means, a tire band assuming a radial position on the rim and encircling about said lugs, means straddling said tire band passing through the lugs and operatively connected to the first means for securing said parts together.

3. A tractor wheel comprising a pair of rim bands relatively spaced, holding plates connected to the inner surfaces of the rim bands, tractor lugs on the exterior surface of the rim bands and in register with the plates, means on the rim bands operatively engaging said lugs to assist in holding them in position, a tire band encircling about the lugs substantially centrally between the rim bands, said tire band being disposed radially of the wheel, and staples straddling the tire band and passing through the lugs and through the plates and provided with means on their inner ends for securing the bars together.

4. A tractor wheel comprising a pair of rim bands relatively spaced, holding plates connected to the inner surfaces of the rim bands, tractor lugs on the exterior surfaces of the rim bands and in register with the plates, means on the rim bands operatively engaging said lugs to assist in holding them in position, a tire band encircling about the lugs substantially centrally between the rim bands, said tire band being disposed radially of the wheel, and staples straddling the tire band and passing through the lugs and through the plates and provided with means on their inner ends for securing the bars together, and interconnecting means between the tire band and the lugs, to insure against relative movement of said parts.

5. In a tractor rim, a pair of spaced rim bands, means for securing them relatively in position, tractor lugs on the exterior surface of said bands in register with the securing means, a tire band assuming a position substantially centrally between the rim bands and operatively connected with said lugs, means operatively connected with the tire band and engaging said lugs and being operatively connected to the first means for securing said parts together.

In testimony whereof I hereunto affix my signature.

Mr. MATHIAS V. JARECKI.